United States Patent Office 3,406,120
Patented Oct. 15, 1968

3,406,120
CERAMIC PACKING MATERIAL FOR THE PREVENTION OF METHACRYLATE AND ACRYLATE ESTER POLYMERIZATION
Hugh J. Hagemeyer, Jr., Alden E. Blood, and Max Statman, Longview, Tex., assignors to Eastman Kodak Company, Rochester, N.Y., a corporation of New Jersey
No Drawing. Original application Dec. 10, 1964, Ser. No. 417,504, now Patent No. 3,332,984, dated July 25, 1967. Divided and this application Mar. 6, 1967, Ser. No. 620,672
5 Claims. (Cl. 252—397)

This application is a divisional application of copending application Ser. No. 417,504, filed December 10, 1964, now Patent No. 3,332,984 which is, in turn, a continuation-in-part of application Ser. No. 124,799, filed July 18, 1961, now abandoned.

This application relates to an improved method for the production of monomeric methacrylate and acrylate esters.

It is known that acrylic amides can be converted to esters by reaction at elevated temperatures with an appropriate alcohol in the presence of water and a strong acid, preferably a mineral acid such as sulfuric acid. Methacrylamide reacts under these conditions, for example, with methyl alcohol, butyl alcohol, etc. to give the corresponding alkyl methacrylates. However, it has been found that esters of this kind polymerize so readily that process equipment becomes plugged with polymeric material and keeps the yield of monomers at relatively low levels. To overcome this disadvantage, it has been proposed to employ well known polymerization inhibitors such as hydroquinone, diphenylamine, phenol, pyrogallol, tannic acid, copper, sulphur and other compounds of similar nature. Air and oxygen have also been proposed as inhibitors. While these compounds decrease the amount of polymer formed, they do not completely eliminate it, especially in processes employing packed reactors and packed distillation columns where the conditions are such as to prevent the use of organic inhibitors and, therefore, require inorganic inhibitors which are less effective than organic inhibitors.

We have now found that polymerization of methacrylate and acrylate esters in the preparation of the monomeric ester compounds in process equipment such as packed distillation columns and packed reactors is prevented by using ceramic packing therein which has been treated with a strong mineral acid and more especially a nitric-sulfuric acid mixture. The effective life of the thus treated packing is so great that no decrease in activity, i.e. prevention of polymerization, was found after two months of continuous operation of such process and equipment.

It is, accordingly, an object of the invention to provide an improved process for the preparation of monomeric methacrylate and acrylate esters. Another object is to prevent polymerization of said esters in the process and purification of the same. Another object is to provide a novel acid treated packing material that prevents polymerization of the said monomers during processing of the same. Other objects will become apparent hereinafter.

In accordance with the invention, we prevent the polymerization of monomeric methacrylate and acrylate esters in the preparation and purification thereof by packing the distillation column of the reactor with ceramic materials ordinarily used as a packing but which have been first treated with a mixture of strong mineral acids or other compounds that produce oxides of nitrogen under the conditions leading to bonding or absorption of the oxides of nitrogen or their ions or radicals to the ceramic packing. It is of particular significance that the ostensibly equivalent procedure of introducing oxides of nitrogen into the column or the reactant feeds rather than to treat the packing material is in fact quite ineffective in preventing polymerization in the reactor as illustrated by the following experiment:

A glass column 48 inches long and 1.61 inches in diameter containing 90 cubic inches of ¼ inch unglazed prolelain Berl saddles was heated with a Chromel wire-wound jacket. The lower end of the column was maintained at about 105–115° C. and the upper end at about 101–110° C. A 2-liter reboiler (base heater) containing a water solution of ammonium acid sulfate and sulfuric acid maintained at about 112–124° C. was connected to the bottom of the column. Methacrylamide prepared by the amide synthesis from 2,810 ml. of acetone cyanohydrin and 3,660 ml. of 100 percent sulfuric acid was fed at a substantially constant rate during the course of 17.3 hours into the top of the column maintained at about 98–105° C. along with 8,200 ml. of water. 10,225 ml. of isobutanol was vaporized at > 108° C. and fed to the reboiler at a substantially constant rate also during the course of said 17.3 hours and was carried up the column with steam fed into the reboiler via a water vaporizer. As the amide acid solution flowed down the reactor it reacted with the alcohol vapor and produced the methacrylate ester. The ester was vaporized and carried out of the column into a decanter along with unreacted alcohol and water. The co-product ammonium acid sulfate flowed down the column to the reboiler where it was removed through a drain. Substantial amounts of nitric oxide was added to the methacrylamide-feed solution and also to the reboiler in carrying out the above process. Sufficient nitric oxide was added to the methacrylamide-feed solution to saturate the same with nitric oxide, and nitric oxide was fed to the reboiler at approximately 20 ml. (S.T.P.) per minute. Air was also introduced into the reboiler at 50 to 100 ml. per minute in an attempt to further inhibit polymerization. At the end of said 17.3 hours of operation, the reactor became completely plugged with polymer and was thus rendered totally ineffective.

The treatment of the ceramic packing is carried out conveniently by soaking the packing in a nitric-sulfuric acid mixture for several hours, removing the acid mixture, and then washing the so treated packing with water. The acid concentrations for both the nitric acid and the sulfuric acid may be varied from the strength of commercial concentrated acids to fuming acids containing varying amounts of the free anhydrides, for example, concentrated nitric acid containing free $NO_2$ and concentrated sulfuric acid (oleum) containing free $SO_3$. In the case of the latter, the $SO_3$ content may be for technical grades up to 66%, while a content as high as 90% is known. The ratio of nitric to sulfuric acids is not critical as long as appreciable amounts of both acids are present in the acid mixture. Actually any mixture of acids or other compounds that produce oxides of nitrogen can be used; for example, a mixture of concentrated sulfuric acid and various salts of nitric and nitrous acids such as nitrates or nitrites. The preferred acid mixtures for treating the packings employed in the invention comprise combinations of concentrated sulfuric acid or oleum and concentrated nitric acid. A typical mixture comprises equal volumes of the concentrated acids. Another efficacious mixture comprises equal volumes of concentrated nitric acid and oleum containing 20 percent of $SO_3$. The temperature of the mixtures as used for treating the packing also is not critical, but generally in the range of about 15–60° C., and preferably at or about normal room temperatures of 20–30° C. The time of treatment should be sufficient to activate the packing, but advantageous results are obtained with treatment periods as low as 15 minutes and up to 12–24 hours; however, no additional advantage appears obtainable by prolonged treatments.

Suitable ceramic packing that can be treated according to the invention includes any ceramic materials used as packing for one reason or another in chemical reactions and columns. The term "ceramic," as used in the description, is meant to apply to porcelain and stoneware products prepared from varying amounts of clay, flint and feldspar. Porcelain and stoneware differ primarily in porosity. Chemically speaking, ceramic materials are composed of aluminum silicate, silica and potassium aluminum silicate so that any material containing these or analogous components would be operable in the invention whether called ceramics, porcelain, stoneware, etc. or not. Thus, packings now known which can be used efficaciously in the practice of our invention include ceramic or ceramic-like shaped articles known in the art under the names of Raschig rings, Lessing rings, Cross-partition rings, Spiral rings, Intalox rings, but more particularly Berl saddles which is the preferred packing. Actually, the packing to be treated can be in any shaped form desired, the object being to bring the treated and activated ceramic or ceramic-like material in intimate contact with the monomer liquid and/or vapor. This can be carried out in any conventional equipment that utilizes a packing in the processing of methacrylate and acrylate esters. Advantageously, the equipment comprises a tubular reactor and fractionating column packed with the mentioned ceramic packing materials which have been treated in accordance with the invention, and provided with conventional heating, feeding withdrawal and refluxing means, but preferably having the amide feed enter the upper region of the column and the alcohol feed enter the lower region of the column, the formed esters passing overhead to a condenser while sulfuric acid or other such strong acid, water and ammonium salts are removed from the base through a drain connected at the base of the column.

In carrying out the process of the invention, the reactants comprising methacrylamide or acrylamide, alcohol, a strong acid selected from the group consisting of $H_2SO_4$, $HCl$ and $H_3PO_4$ with sulfuric acid being preferred, and water, are passed into the reactor column containing the acid treated ceramic packing material. The useful strong acids may generally be defined as those which ionize in water essentially 100% to give hydronium ions and the acid anion. The amide feed containing the strong acid is preferably passed in liquid form into the column at or near the top of the column, and the alcohol feed and water feed is passed into the column at or near the base of the column, while the strong acid, water and ammonium salts are removed from the base through a suitable drain. The water is preferably added to the base reboiler in the form of steam. Advantageously, phenolic inhibitors such as phenol, cresol, etc. and air are also added to the column, the former at the top section and the latter at the bottom section to inhibit polymerization in the reboiler section of the reactor column. However, these types of inhibitors are wholly ineffective by themselves in preventing polymerization of the unsaturated monomers in the esterification and fractionating sections of the column. While the invention is applicable to batch processes, it is primarily adapted to a continuous mode of operation wherein the addition and withdrawal of materials are carried out continuously and so regulated as to balance one another. The column need be shut down only at intervals of several weeks or more to replace with freshly mixed acid treated packing, whereas in similar operations employing untreated packing, severe clogging of the column from polymer formation therein occurs in about a day or less of operation.

The following examples will serve to illustrate further the manner of carrying out the process of the invention.

Example 1

This example is for comparison purposes and illustrates the very much improved results obtained by the process of the invention employing a ceramic packing material pretreated with a mixture of nitric and sulfuric acids in the reactor column as compared with the results obtained with the untreated ceramic material under the same conditions of reaction.

The reactor employed in the following Experiments A and B consisted of a glass column 48" long and 1.61" in diameter containing 90 cubic inches of ¼" unglazed porcelain Berl saddles. The reactor was heated with a Chromel wire-wound jacket. Isobutanol was fed into the 2-liter base heater with a Cerveny micro-bellow pump. Air was introduced into the base at rates of 50–100 ml. per minute as a polymerization inhibitor. Aqueous methacrylamide containing sulfuric acid was fed to the top of the reactor while a preheater was used on the alcohol feed to the base. A decantor separated water from the crude product. Sulfuric acid, water, and ammonium salts were removed from the base through the drain. In Experiments C and D, the reactor was increased in size to 72" x 2.0" and contained 220 cubic inches of ¼" unglazed porcelain Berl saddles.

A. Aqueous methacrylamide prepared in the amide synthesis form 2,810 ml. of acetone cyanohydrin and 3,660 ml. of 100 percent sulfuric acid was fed into the top of the reactor with 8,200 ml. of water while 10,225 ml. of isobutanol was fed to the base heater all during the course of 15.8 hours. Phenol and air were also fed into the reactor during this time to inhibit polymerization in the reboiler section of the reactor. A total of 5,124 g. of crude organic product was obtained from the decanter when the reactor column become plugged with polymer. This is equivalent to 56.8 grams of organic product per cubic inch of Berl saddles.

B. The reactor packing was then replaced with ¼" unglazed porcelain Berl saddles which had been treated as follows:

Clean Berl saddles were covered with a mixture prepared from equal volumes of fuming sulfuric acid (20 percent sulfur trioxide) and concentrated nitric acid. After 12 hours, the acid mixture was poured off and the saddles were washed twice with water.

The reactor was run as before feeding methacrylamide obtained from the reaction of 32,770 ml. of acetone cyanohydrin and 37,160 ml. of 100 percent sulfuric acid along with 34,980 ml. of water and 90,000 ml. of isobutanol during the course of 162.1 hours. Phenol and air were added as in above A. During this time, there was obtained 88,134 g. of crude isobutyl methacrylate from the decanter. This is equivalent to about 980 grams of product per cubic inch of Berl saddles. The reactor was shut down for modification. Examination of the packing showed no sign of any polymer.

C. The reactor was started up using the larger column described earlier. It was first packed with 220 cubic inches of untreated ¼" unglazed procelain Berl saddles. Using the same feed rates and materials as before, the reactor ran 25 hours before polymerization in the packed section forced a shut down. A total of 13,600 grams of crude isobutyl methacrylate had been collected, which is 61.8 grams of product per cubic inch of Berl saddles.

D. The packing of the reactor used in above C was then replaced with the same amount of ¼" unglazed porcelain Berl saddles treated as described in part B. Running at the same feed rates and with the same materials as before for 60 days, a total of 239,360 grams of crude isobutyl methacrylate was collected. This is equivalent to 1,090 grams of product per cubic inch of Berl saddles. The reactor was shut down for modification. Examination of the packing did not disclose any polymer formation.

It will be noted from above Examples 1A and C wherein untreated Berl saddles were employed, that the yield of product was only 57 and 62 g./cubic inch of packing, respectively, before polymerization became severe enough to force a complete shutdown of the reactor. However, when the acid treated Berl saddles were employed as in above Example 1B and D, the yield of product increased to about 890 and 1090 g./cubic inch of the treated packing, respectively, before the reactors were shut down for reasons other than polymerization. Thus, the final capacity of the packing treated according to the invention to prevent polymerization is not accurately known, but all the evidence points to an active life period much greater than 18 times that of the untreated packing.

Example 2

Clean unglazed porcelain Berl saddles were covered with a mixture prepared from equal volumes of fuming sulfuric acid (20 percent sulfur trioxide) and concentrated nitric acid. After 12 hours the acid mixture was poured off and the saddles were washed twice with water. The treated packing was used in a reactor employed in the preparation of isobutyl methacrylate by the reaction of isobutanol, water, strong sulfuric acid, and methacrylamide. Phenol and air were used during the process to inhibit polymerization in the reboiler section of the reactor. After ten days of continuous operation no polymer was formed in the packed section of the reactor but on replacing the treated Berl saddles with untreated Berl saddles and running the unit as before the packed section of the reactor became plugged with polymer after only 12 hours of operation. On replacing the untreated Berl saddles with Berl saddles treated as described, the reactor was operated for two months without any visible polymer formation in the packed section.

Example 3

Clean unglazed porcelain Berl saddles were covered with a mixture prepared from equal volumes of concentrated surfuric acid and concentrated nitric acid. After 8 hours the mixture was removed from the Berl saddles and the saddles were washed twice with water. The treated packing was used to prepare a distillation column for the purification of methacrylate esters. The distillation column was operated for two months without any visible polymer formation. The column operated under identical conditions but with stainless steel or untreated Berl saddles quickly became inoperative due to polymer formation.

While the invention has been illustrated in the above examples with just the preparation of isobutyl methacrylate, will be understood that the methacrylamide intermediate in the examples can be substituted by a like amount of acrylamide to give the corresponding isobutyl acrylate in generally similar good yields/cc. of the acid treated packing. Also, the isobutanol employed in the examples can be replaced with a like amount of any alcohol that is capable of entering into esterification reactions with acrylic and methacrylic acids. In this regard it is noted that the —OH group is the functional group of these alcohols and its reactivity is not affected even by relatively large radicals such as naphthalene and the like. Therefore, it is obvious to those skilled in the art that a great and diverse group of alcohols generally known to esterify acrylic and methacrylic acids may be successfully employed in the present invention. Examples of useful straight or branched, saturated aliphatic alcohols are methyl, ethyl, propyl, butyl, isopropyl, sec. butyl, tert. butyl, amyl, hexyl, heptyl, octyl, nonyl, decyl, dodecyl, tetradecyl, hexadecyl, 2-methyl-1-butyl, 3-methyl-1-butyl, 3-pentyl, 2-methyl-1-pentyl, 2-ethyl-1-butyl, 4-methyl-2-pentyl, 2-heptyl, 2-ethylhexyl, 2-octyl, 5-ethyl-2-nonyl, and 2-methyl-7-ethyl-4-undecyl. Other exemplary alcohols are the aromatic or cycloaliphatic alcohols, for example, benzyl, phenylethyl, chlorophenyl, cyclohexyl, cyclobutyl, cyclopentyl and the like. Other useful alcohols are 2-methoxethyl, 2-ethoxyethyl, 2-butoxyethyl, tetrahydrofurfuryl, o-tolyl, and 2-nitro-2-methyl propyl methacrylate.

Thus, the invention has wide applicability for preparing the various esters of methacrylic and acrylic acids by appropriate selection of the alcohol that is reacted with the mentioned amide in accordance with the following reaction scheme.

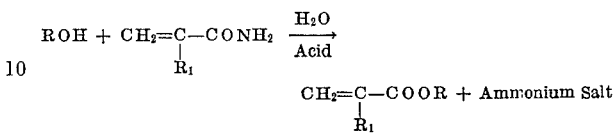

wherein R stands for the radical of any alcohol which can esterify acrylic or methacrylic acid, and $R_1$ stands for hydrogen or a methyl radical. Also, as hereinbefore indicated, the invention is efficacious for indefinitely long periods of operational time without polymerization difficulties, whereas the older methods only partially prevent polymerization. Another advantage of the invention is that the continuous addition of inhibitor compounds is not required in the region specified by this invention, i.e. in the reactor column. Further, this invention can be applied to manufacturing processes that would destroy or otherwise inactivate many of the usual organic inhibitors. The invention also eliminates the need to practice special operational procedures to remove polymer formed during normal operation as is the case with processes using only the conventional inhibitors.

The invention has been described in detail with particular reference to preferred embodiments thereof, but it will be understood that variations and modifications can be effected within the spirit and scope of the invention as described hereinabove and as defined in the appended claims.

We claim:

1. A ceramic packing material prepared by pretreatment of an unglazed ceramic material selected from silica and silicates, the pretreatment comprising soaking the untreated unglazed ceramic packing material in a concentrated nitric-sulfuric acid mixture for at least about fifteen minutes, at a temperature of about 15–60° C., removing the ceramic material from the bath, and rinsing the ceramic material with water.

2. A composition as in claim 1 wherein the nitric-sulfuric acid mixture consists essentially of substantially equal volumes of concentrated nitric acid and concentrated sulfuric acid.

3. A composition as in claim 1 wherein the nitric-sulfuric acid mixture consists essentially of substantially equal volumes of (1) concentrated nitric acid and (2) sulfuric acid containing about 20% free $SO_3$.

4. A composition as in claim 1 wherein the treatment comprises soaking said unglazed ceramic material in the acid bath for about 12 to 24 hours at a temperature of from about 20° to 30° C.

5. A process for the preparation of the ceramic packing material of claim 1 comprising (1) contacting said unglazed ceramic packing material with a concentrated nitric-sulfuric acid mixture for at least fifteen minutes and (2) rinsing the ceramic material with water.

References Cited

UNITED STATES PATENTS 2,485,626 10/1949 Mills _____ 252—450 X
2,967,156 1/1961 Talvenheimo _____ 252—450 X

OTHER REFERENCES

Webster's Dictionary, G. and C. Merriam Co., 1960, p. 136.

LEON D. ROSDOL, *Primary Examiner.*

I. GLUCK, *Assistant Examiner.*